US009961933B2

(12) United States Patent
Fields

(10) Patent No.: US 9,961,933 B2
(45) Date of Patent: May 8, 2018

(54) CONVERTIBLE JUICER

(71) Applicant: Omega Products, Inc., Harrisburg, PA (US)

(72) Inventor: Timothy Fields, Hummelstown, PA (US)

(73) Assignee: OMEGA PRODUCTS, INC., Harrisburg, PA (US)

(*) Notice: Subject to any disclaimer, the term of this patent is extended or adjusted under 35 U.S.C. 154(b) by 554 days.

(21) Appl. No.: 14/506,984

(22) Filed: Oct. 6, 2014

(65) Prior Publication Data
US 2016/0095345 A1    Apr. 7, 2016

(51) Int. Cl.
A23N 1/02    (2006.01)
A47J 19/02    (2006.01)

(52) U.S. Cl.
CPC .............. A23N 1/02 (2013.01); A47J 19/025 (2013.01)

(58) Field of Classification Search
CPC .. A23N 1/00; A23N 1/02; A23N 1/003; A47J 19/025
USPC ......... 99/501, 502, 503, 509, 510, 511, 513; 100/117, 145, 147, 148
See application file for complete search history.

(56) References Cited

U.S. PATENT DOCUMENTS

| 2,415,939 | A | * | 2/1947 | Doner | A47J 43/04 248/299.1 |
| 4,385,553 | A | | 5/1983 | Ihara et al. | |
| 5,452,650 | A | * | 9/1995 | Lee | A47J 19/06 241/101.2 |
| 5,743,176 | A | * | 4/1998 | Anderson | A23N 1/00 99/512 |
| 5,806,413 | A | | 9/1998 | Trovinger | |
| 7,958,819 | B2 | * | 6/2011 | Sands | A47J 19/027 366/205 |
| 8,161,872 | B2 | * | 4/2012 | Rivera | A47J 19/02 100/130 |
| 9,210,950 | B2 | * | 12/2015 | DesJardin | A23N 1/02 |
| D775,491 | S | * | 1/2017 | Brinkley | D7/372 |
| 2006/0169152 | A1 | * | 8/2006 | Lin | A47J 19/025 99/495 |
| 2007/0272091 | A1 | * | 11/2007 | Hsien | A47J 19/022 99/501 |
| 2009/0064875 | A1 | | 3/2009 | Trovinger | |
| 2015/0320106 | A1 | * | 11/2015 | Lee | A47J 19/027 99/510 |

FOREIGN PATENT DOCUMENTS

EP    2777449    *    9/2011    .............. A47J 19/06

* cited by examiner

Primary Examiner — Arthur O Hall
Assistant Examiner — Christopher R Dandridge
(74) Attorney, Agent, or Firm — Michael E. Dockins; Shumaker, Loop & Kendrick, LLP

(57) ABSTRACT

A convertible juicer is disclosed. The convertible juicer includes a shell formed from a plurality of removable shell segments and an extraction assembly. The extraction assembly is disposed in the shell. The extraction assembly including a drum, a compression chamber disposed in the drum, and an auger disposed in the drum and received by the compression chamber. The extraction assembly and the shell are convertible between a storage configuration and a juicing configuration.

20 Claims, 4 Drawing Sheets

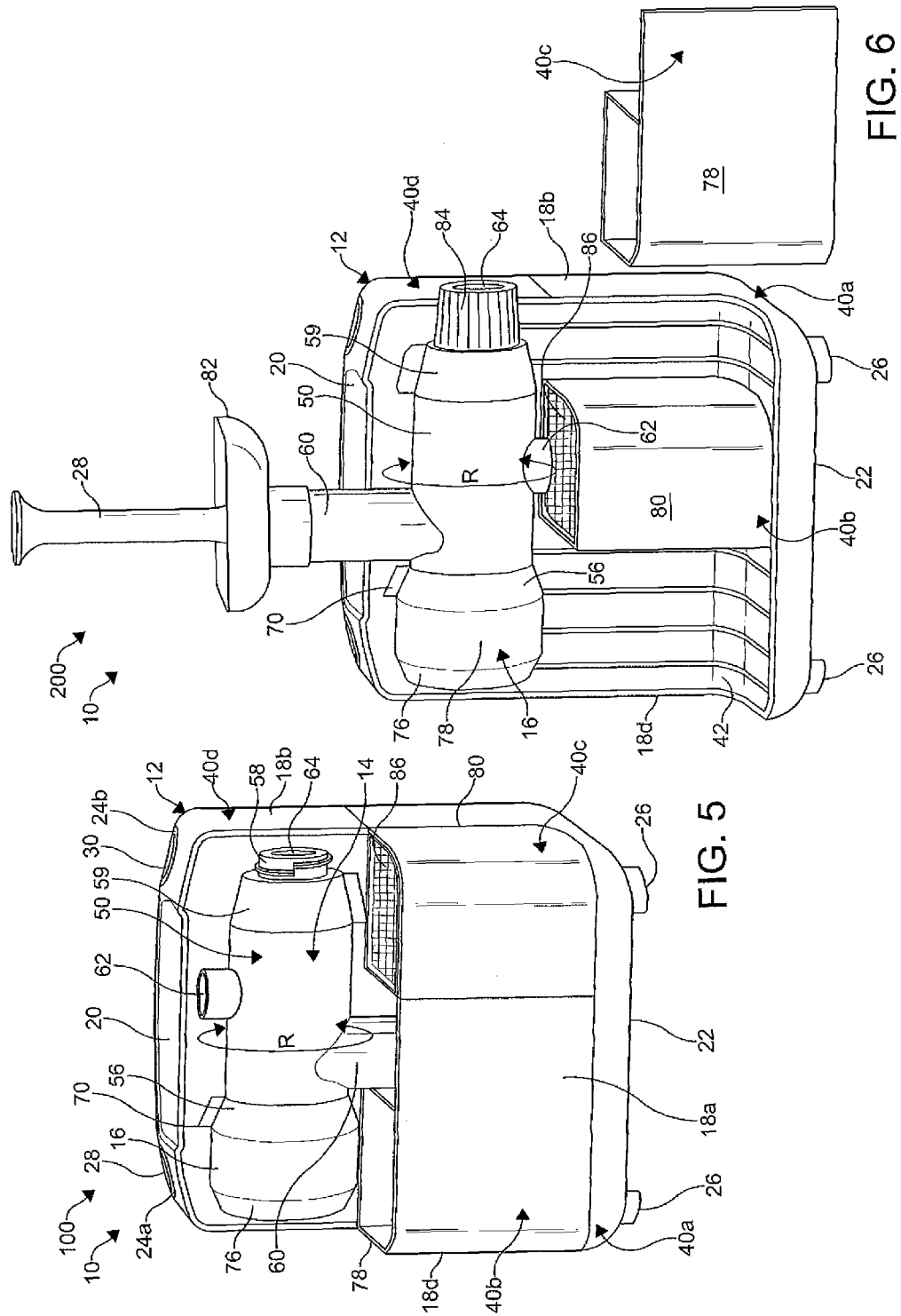

CONVERTIBLE JUICER

FIELD OF INVENTION

The present disclosure relates to a juicer, and more particularly to a juicer convertible between a compact storage configuration and a juicing configuration.

BACKGROUND OF THE INVENTION

Various juicers are known in the prior art to extract juice from or process various foods. The juicers typically include numerous assembly components such as a base, an auger or screw, a drum, a hopper, screens, juice bowls or pulp bowls, and other interchangeable components and attachments, for example.

However known juicers, whether assembled or disassembled, can be unwieldy and difficult to store. For example, when assembled, the juicer may be overly bulky and occupy an excessive amount of space which can prevent the juicer from being stored in desired storage spaces or compartments. In another example, when disassembled, the individual components are numerous. The numerous components can easily become unorganized, damaged, lost, and/or displaced when moved or stored in various storage spaces and compartments. Additionally, the assembled or disassembled juicer may accumulate particles such as dust or dirt when placed in certain storage spaces or compartments. Furthermore, because the juicers are bulky and contain numerous components, the juicers are occasionally stored in exposed areas which can be aesthetically displeasing for users.

It is desirable to have a juicer that maximizes storage space, provides organized and secure containment of assembly components, and facilitates effortless assembly, disassembly, and sanitizing thereof.

SUMMARY OF THE INVENTION

Consonant with the instant disclosure, a horizontal juice extractor that maximizes juice output and optimizes a nutritional content of the extracted juice has surprisingly been discovered.

In one embodiment, a convertible juicer is disclosed. The convertible juicer includes a shell formed from a plurality of removable shell segments and an extraction assembly disposed in the shell. The extraction assembly includes a drum, a compression chamber disposed in the drum, and an auger disposed in the drum and received by the compression chamber. The extraction assembly and the shell are convertible between a storage configuration and a juicing configuration.

In another embodiment, a juicer convertible between a storage configuration and a juicing configuration is disclosed. The juicer includes a shell and an extraction assembly rotatably and retractably positioned in the shell. The extraction assembly is selectively positionable in at least a first position for the storage configuration and a second position for the juicing configuration. The extraction assembly includes a drum, a compression chamber disposed in the drum, and an auger disposed in the drum and received by the compression chamber.

In a further embodiment, a juicer convertible between a storage configuration and a juicing configuration is disclosed. The juicer includes a plurality of shell segments removeably coupled to each other to form a shell. A motor assembly is disposed in the shell. An extraction assembly retractably is positioned in the shell and coupled to the motor assembly. The extraction assembly includes a drum, a compression chamber disposed in the drum, and an auger disposed in the drum and received by the compression chamber. The extraction assembly is selectively positionable in at least a first position for the storage configuration and a second position for the juicing configuration. The extraction assembly is configured to extract juice from a food and for non-juicing processing operations.

DRAWINGS

The above, as well as other advantages of the present disclosure, will become readily apparent to those skilled in the art from the following detailed description, particularly when considered in the light of the drawings described hereafter.

FIG. 5 is a front perspective view of the juicer of FIG. 1, wherein a front upper segment is removed from the juicer exposing a portion of an extraction assembly of the juicer; and FIG. 6 is a front perspective view of the juicer of FIG. 1, wherein the juicer is in a juicing configuration.

DETAILED DESCRIPTION OF THE INVENTION

Figure 1:
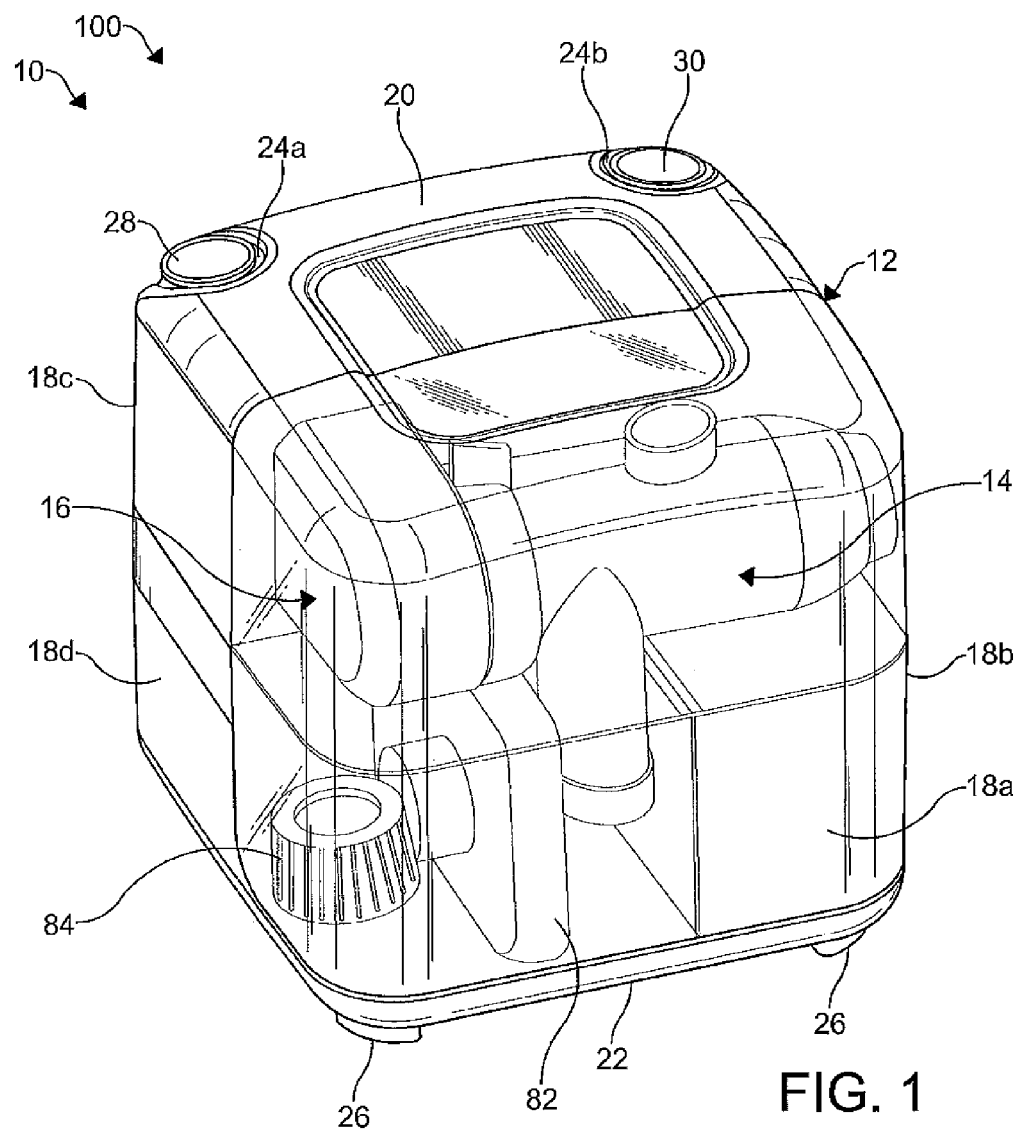
FIG. 1 is a top perspective of the juicer in a storage configuration according to an embodiment of the present disclosure.

The following detailed description and appended drawings describe and illustrate various exemplary embodiments of the invention. The description and drawings serve to enable one skilled in the art to make and use the invention, and are not intended to limit the present disclosure, application, or uses. The terms upper, lower, top, bottom, front and rear are used herein merely for descriptive convenience and are not intended to imply locational or orientational restriction. The terms apply to a juicer in its normal disposition in use and with respect to the direction of gravity. It should also be understood that throughout the drawings, corresponding reference numerals indicate like or corresponding parts and features.

FIGS. 1-5 illustrate a convertible juicer 10. The juicer 10 includes a shell 12 and an extraction assembly 14. The juicer 10 is convertible between a storage configuration 100, as illustrated in the embodiments of FIGS. 1-3 and 4, and a juicing configuration 200, as illustrated in the embodiment of FIG. 5. The juicer 10 may be used to extract a juice from foods such as fruits and vegetables, for example. The juicer 10 can also be used for non-juicing processing operations such as mincing, grinding, whipping and extruding foods, for example.

Figure 2:
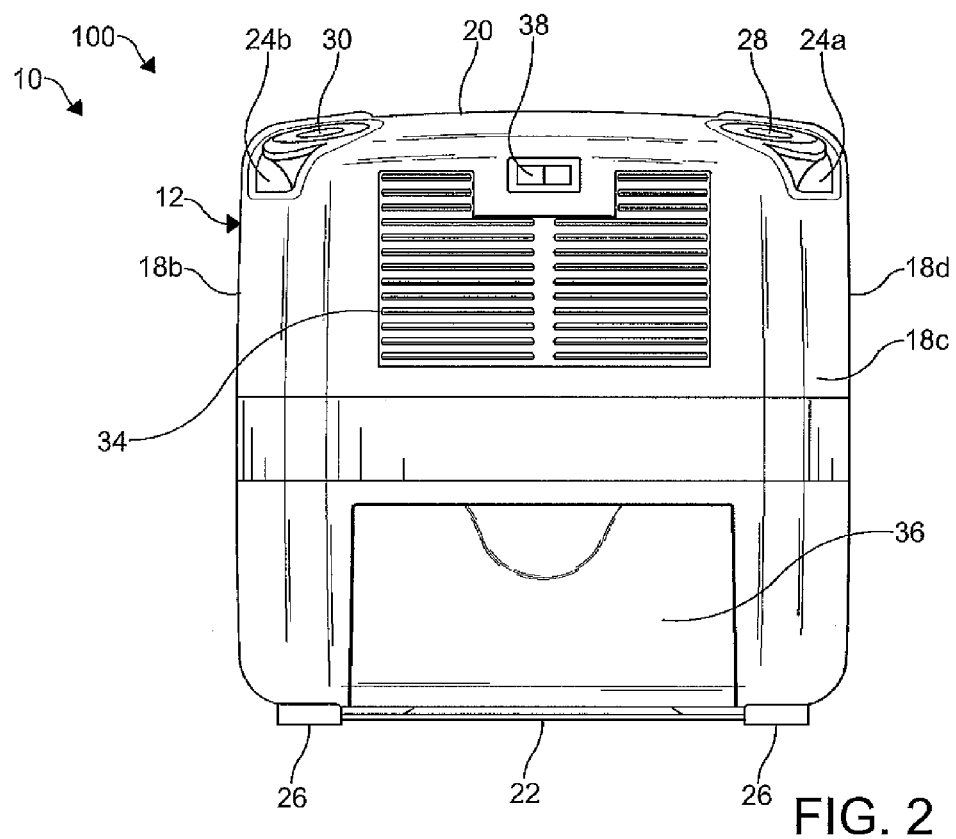
FIG. 2 is a rear elevational view of the juicer of FIG. 1.
Figure 3:
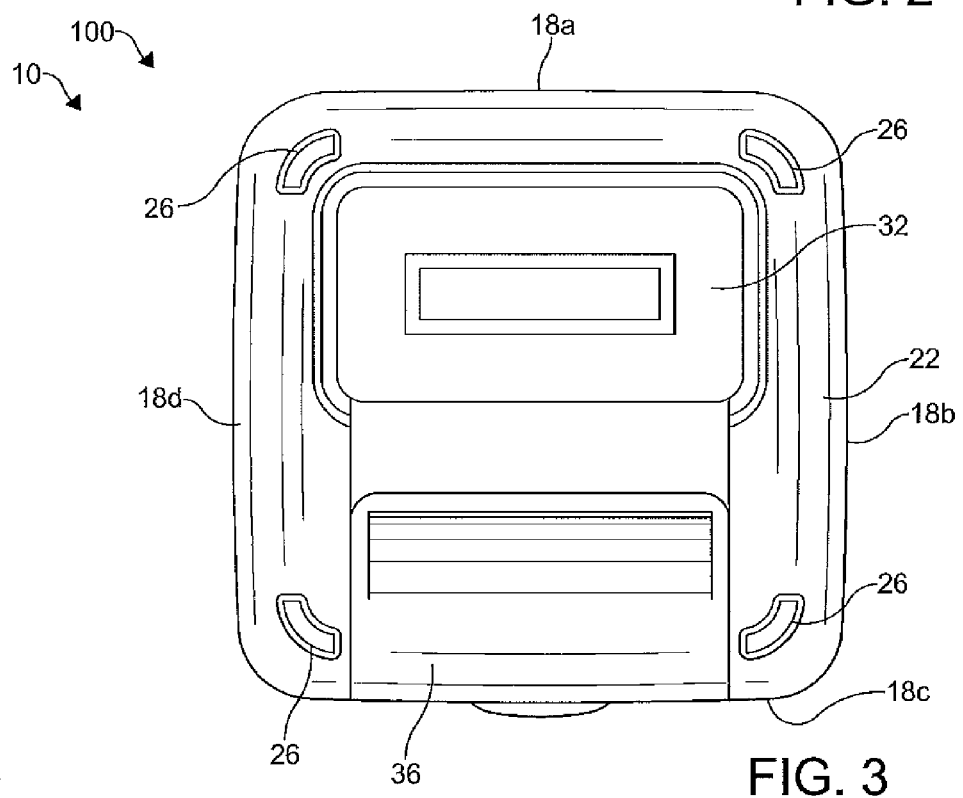
FIG. 3 is a bottom plan view of the juicer of FIG. 1.

In FIGS. 1-3, the shell 12 is configured to contain the extraction assembly 14 and a motor assembly 16 for operating the extraction assembly 14. The shell 12 facilitates compactness and ease of storage. In FIG. 1, for illustrative purposes, at least a portion of the shell 12 is transparent to show the extraction assembly 14 and motor assembly 16 disposed within the shell 12. However, the shell 12 may be transparent or opaque and can be produced from polymeric material, such as a polycarbonate, a metal, or other similar or suitable materials.

With continuing reference to FIGS. 1-3, the shell 12 includes a plurality of substantially planar sidewalls 18a, 18b, 18c, 18d, a top wall 20, a bottom wall 22, and plurality of feet 26 coupled to the bottom wall 22 to support the juicer 10. It is understood that other embodiments of the invention do not include any feet 26 and the bottom wall 22 of the juicer 10 rests on a counter or other support structure. When the juicer 10 is in the storage configuration 100, the shell 12 has a substantially cubical shape for compactness and ease of storage. However, it is understood, in other embodiments the shell 12 can include any number of sidewalls 18a, 18b, 18c, 18d, as desired, such as three walls, five walls, and six walls, for example. Additionally, the shell 12 can have any shape as desired. For example, the shell 12 can have a substantially cuboidal shape, a conical shape, an orthope, a hyperrectangle, a spherical shape, an ovoidal shape, or any other shape to facilitate compactness and ease of storage.

The shell 12 can include apertures 24a, 24b formed therein. The apertures 24a, 24b are configured for receiving and containing components of the juicer 10. For example, one of the apertures 24a can receive and contain an insert 28 and another of the apertures 24b can receive and store a cleaning utensil 30, such as a brush or a scraper for cleaning the juicer 10. Sleeves can be received in each of the apertures 24a, 24b to form a compartment for receiving and containing the insert 28 and the cleaning utensil 30. Additional or fewer apertures can be formed in the shell 12 and configured to receive any juicer component, as desired.

The shell 12 may further include a frame 32 (see FIG. 4) for retaining electrical components such as a power cord, a vent portion 34 to facilitate a flow of heat energy from an interior of the shell 12 to militate against overheating of the juicer 10, a storage compartment 36 received in an opening in the sidewall 18c of the shell 12, and a control device 38 for controlling the operation of the motor assembly 16. In certain embodiments, the storage compartment 36 is pivotally coupled to the shell 12 to facilitate opening and shutting the storage compartment 36. However, other configurations of the storage compartment 36 received in the opening of the shell 12 can be contemplated as desired.

Figure 4:
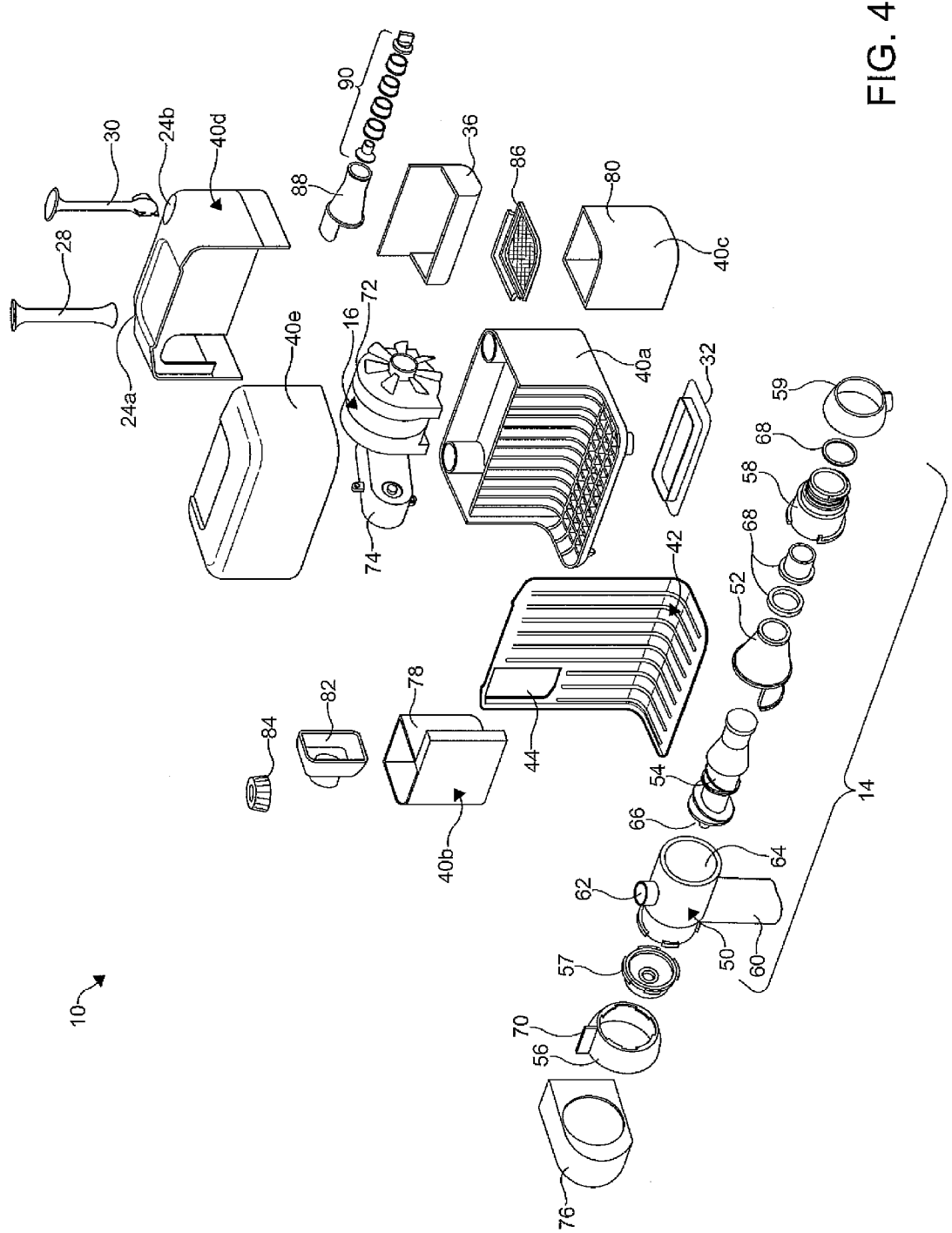
FIG. 4 is an exploded left side perspective view of the juicer of FIG. 1.

As illustrated in FIG. 4, a plurality of shell segments 40a, 40b, 40c, 40d, 40e align and cooperate with each other to form the shell 12. The shell segments 40a, 40b, 40c, 40d, 40e can be releasably coupled to each other by any engagement means (not shown). It is understood that the shell segments 40a, 40b, 40c, 40d, 40e may be pivotally coupled to each other or other components of the juicer, as desired. The engagement means are configured to facilitate removeably securing and guiding each of shell segments 40a, 40b, 40c, 40d, 40e to each other to form the shell 12. For example, the engagement means can be magnets, snaps, clasps, latches, inter-engaging male and female members, friction fit components or the like, hook-and-loop systems, securement or guiding pins and slots, other fasteners, a combination thereof, or any other engagement means, as desired.

Any number or configuration of shell segments 40a, 40b, 40c, 40d, 40e can be employed to form the shell 12. For example, in certain embodiments, the plurality of shell segments 40a, 40b, 40c, 40d, 40e may include: a base segment 40a for receiving and supporting the motor assembly 16 of the juicer 10; a first lower front segment 40b; a second lower front segment 40c; an upper rear segment 40d cooperating with the base segment 40a to form a rear shell portion for housing the motor assembly 16; and an upper front segment 40e cooperating with the base segment 40a to form a front shell portion for housing the extraction assembly 14.

In certain embodiments, a plate 42 can be disposed within in the shell 12 such as adjacent an inner wall formed by the base segment 40a and the upper rear segment 40d to separate the rear shell portion from the front shell portion. The plate 42 may include an opening 44 through which a portion of the motor assembly 16 is disposed.

With continuing reference to FIG. 4, the extraction assembly 14 includes a drum 50, a compression chamber 52, an auger 54, and an end cap 58. The auger 54 is configured to move food through the extraction assembly 14. The auger 54 can be any auger having a helical shaft configured for moving food through the extraction assembly 14, now known or later developed. Examples of augers are described in numerous applications such as U.S. Pat. Appl. Pub. No. 2013/0074707 and U.S. Pat. No. 8,474,374, all of which are hereby incorporated by reference in their entirety. The auger 54 includes a transmission shaft 66 extending through one end of the auger 54. The transmission shaft 66 is configured to couple the auger 54 to the motor assembly 16.

The compression chamber 52 is hollow and receives the auger 54. The compression chamber 52 may be conically shaped, for example, as illustrated in FIG. 4. However, it is understood other suitable shapes capable of receiving the auger 54 may also be employed, as desired. In certain embodiments, the compression chamber 52 may be configured to extract juice from the food. To extract juice from the food, the compression chamber 52 may include strainer portions having a plurality of openings (not shown) to facilitate extracting juice from the desired food. An example of a compression chamber configured to extract juice from a food is described in U.S. Pat. Appl. Pub. No. 2013/0074707, hereby incorporated by reference in its entirety. In other embodiments, the compression chamber 52 can be a fluid impermeable chamber configured for non juicing processing operations.

The drum 50 houses the compression chamber 52 and the auger 54. The drum 50 may be substantially cylindrically shaped. However, the drum 50 may be any size and shape capable of receiving the compression chamber 52 and the auger 54. Various suitable sizes and shapes of the drum 50 are contemplated and may be used within the scope of the disclosure. The drum 50 is closed at a first end thereof and includes a residue outlet 64 formed at a second end thereof. The transmission shaft 66 of the auger 54 may be received through an aperture formed in the first end of the drum 50 to be coupled to the motor assembly 16.

The drum 50 may include a feed channel 60 extending outwardly therefrom, and through which food is passed when the juicer 10 is in the juicing configuration 200. The feed channel 60 is configured to receive the insert 28 which may be used to force the food through the feed channel 60, if necessary. A juice outlet 62 is formed on a surface of the drum 50 at a position diametrically opposing the feed channel 60, for example. The end cap 58 may be disposed at the second end of the drum 50 and may be integral with, or a separate component from, the residue outlet 64. An end cap lock 59 can be used to couple the end cap 58 to the drum 50 and maintain the compression chamber 52 within the drum 50. It is understood the extraction assembly 14 can include other extraction components 68 such as seals, rings, and extraction nozzles to facilitate juicing and/or processing food.

As shown in FIGS. 5-6, the extraction assembly 14 is rotatingly coupled to the motor assembly 16 and is rotatable about a longitudinal axis thereof to selectively position the extraction assembly 14 in various positons. The extraction assembly 14 can also be coupled to portions of the shell 12, if desired. A direction of rotation of the extraction assembly 14 is indicated by an arrow R. The extraction assembly 14 can be selectively positioned to retract to a first position for the storage configuration 100 (as shown in FIGS. 1 and 5) or to extend to a second position for the juicing configuration 200 (as shown in FIG. 6).

In the first position, the feed channel 60 extends downwardly towards the bottom wall 22 and the juice outlet 62 extends upwardly towards the top wall 20. In the second position, the feed channel 60 extends upwardly and outwardly with respect of the shell 12 and the juice outlet 62 faces downwardly towards the bottom wall 22. In a non-limiting example, the extraction assembly 14 is rotated about 180 degrees from the first position to the second position. It is understood, the extraction assembly 14 can be rotated to other positions at varying degrees, as desired, for the storage configuration, the juicing configuration, or any other configuration as desired. For example, the extraction assembly 14 can be rotated to a position where the feed channel 60 extends towards the front of the juicer 10 and the juice outlet 62 extends towards the rear of the juicer 10.

A locking member 56 is configured to lock the rotatable extraction assembly 14 in the first position or the second position. In certain embodiments, the locking member 56 is a locking ring having grooves formed therein. The grooves engage with protuberances formed on an outer surface of the drum 50. The locking member 56 is coupled to the motor assembly 16 by a coupler 57 and releasably coupled to the first end of the drum 50 of the extraction assembly 14. The locking member 56 can rotate in a first direction to a lock position and in a second direction to an unlock position. In the unlock position, the drum 50 of the extraction assembly 14 is loosely received in the locking member 56 permitting the extraction assembly 14 to freely rotate from the first position to the second position. In the lock position, the drum 50 of the extraction assembly 14 is firmly securely secured in the locking member 56 and maintained in one position such as the first position or the second position. The locking member 56 may include a tab 70 to facilitate rotating the locking member 56. The locking member 56 can be any other means for locking the rotatable extraction assembly 14 in the desired positions such as a locking collar, cam lock, locking pins, threaded locking rings, latches, or any other locking member as desired.

With continuing reference to FIG. 4, the motor assembly 16 is configured to actuate the auger 54 of the extraction assembly 14. The motor assembly 16 includes a motor 72. As non-limiting examples, the motor 72 may be an electrical motor such as an induction motor, for example, powered by battery, or any other motor capable of producing the required wattage, current, and the like, to actuate the auger 54. In other embodiments, the motor 72 is in electrical communication with an external power source such as an electrical outlet via an electrical cord with a plug. The control device 38 is in signal communication with the motor 72 to control the auger 54.

The motor assembly 16 can include a transmission system 74 including drive components (not shown) such as a belt or gear arrangement or combination thereof to operatively connect the motor 72 to the transmission shaft 66 of the auger 54. The motor 72 can be disposed anywhere in the shell 12, as desired. For example, the motor 72 can be disposed in the rear shell portion and supported by the base segment 40*a*. The transmission system 74 can extend from the rear shell portion to the front shell portion through the opening. 44 formed in the plate 42. A cover 76 can be placed over the portion of the transmission assembly 74 extending into the front shell portion, if desired, for safety or aesthetic purposes.

The juicer 10 may further includes a pulp bowl 78 that forms a portion of the first lower front segment 40*b* and a juice bowl 80 that forms a portion of the second lower front segment 40*c*. The pulp bowl 78 is configured to receive and contain portions of food residue exiting the residue outlet 64 of the extraction assembly 14 when in use. The pulp bowl 78 is retained in the shell 12 when the juicer 10 is in the storage configuration 100. In the embodiment shown in FIG. 4, the pulp bowl 78 is integrally formed with the first lower front segment 40*b*. However, the pulp bowl 78 can be separate from the first lower front segment 40*b* or integrally formed or coupled with any other portion of the shell 12, as desired.

The juice bowl 80 is configured to receive and contain juice exiting the juice outlet 62 when in use. The juice bowl 80 is retained in the shell 12 when the juicer 10 is in the storage configuration 100. In the embodiment shown in FIG. 4, the juice bowl 80 is integrally formed with the second lower front segment 40*c*. However, the juice bowl 80 can be separate from the second lower front segment 40*c* or integrally formed or coupled with any other portion of the shell 12, as desired.

The juicer 10 may further include a hopper 82, an adjustable end cap 84, and a sieve 86. The hopper 82 can be releasably coupled to the feed channel 60. The hopper 82 is configured to facilitate delivery of the food to the feed channel 60. The adjustable end cap 84 engages with the end cap 58 of the extraction assembly 14. to adjustably increases and decreases pressure in the extraction assembly 14 depending on the amount of juice desired from the food and/or the type of food being juiced. The hopper 82 and the adjustable end cap 84 can be retained in the shell 12 for storage. For example, the hopper 82 and the adjustable end cap 84 may be retained in the pulp bowl 78. However, the hopper 82 and the adjustable end cap 84 can be retained in any portion of the shell 12, as desired. The sieve 86 is configured to be removeably positioned over the juice bowl 80 to separate any undesired residue flowing through the juice outlet 62. The sieve 86 can be retained on the juice bowl 80 when the juicer 10 is in the storage configuration 100, for example, or any other portion of the shell 12.

The juicer 10 may include an auxiliary compression chamber 88 and nozzle accessories 90. The auxiliary compression chamber 88 is interchangeable with the compression chamber 52. In a non-limiting example, the auxiliary compression chamber 88 can be a fluid impermeable chamber configured for non juicing purposes. In another example, the auxiliary compression chamber 88 can be used for juicing purposes. Each of the nozzle accessories 90 are configured for coupling to the end cap 58 for juicing or non juicing processing operations such as extruding noodles from dough, mincing, and other extruding processes. It is understood, the juicer 10 can include additional compression chambers, juicing accessories, parts, or utensils, each of which can be stored in the shell 12.

In use, the juicer 10 can be conveniently stored in the storage configuration 100. The storage configuration 100 is compact and space-saving. In the storage configuration 100, the shell segments 40*a*, 40*b*, 40*c*, 40*d*, 40*e* are releasably coupled to each other to form the shell 12. In the storage configuration 100, the extraction assembly 14 is within the shell 12 in the first position. The insert 28 and the cleaning utensil 30 are received within their respective apertures 24*a*,

24b. The various components (the pulp bowl 78, the juice bowl 80, the hopper 82, the adjustable end cap 84, the sieve 86, the auxiliary compression chamber 88, the nozzle accessories 90) of the juicer 10 are also contained and organized within the shell 12 when the juicer 10 is in the storage configuration 100.

To assemble the juicer 10 in the juicing configuration 200, the first lower front segment 40b, the second lower front segment 40c, and the upper front segment 40e are removed from the shell 12, exposing the extraction assembly 14. The upper front segment 40e can be used as a tray or receptacle to facilitate carrying foods or other juicing essentials from storage to the juicer 10 or to dispose of undesired food residue. The locking member 56 is rotated to the unlock position so the extraction assembly 14 can be extended to the second position. The locking member 56 is then rotated to the lock position to maintain the extraction assembly 14 in the second position. The hopper 82 is then coupled to the feed channel 60.

For juicing, the compression chamber 52 is configured for juicing purposes and the adjustable end cap 84 is coupled to the end cap 58 of the extraction assembly 14. The juice bowl 80 and sieve 86 are positioned beneath the juice outlet 62 and the pulp bowl 78 is positioned beneath the residue outlet 64. Food is fed through the feed channel 60 and the motor assembly 16 is turned on. The motor assembly 16 operates to rotate the transmission shaft 66 of the auger 54, causing the auger 54 to rotate. The insert 28 may be used to force the food through the feed channel 60. The food enters the extraction assembly 14 and contacts the first end of the auger 54. As the food passes through the extraction assembly 14, juice is extracted from the food by the auger 54 and from pressure generated between the compression chamber 52 and the auger 54. The extracted juice exits the extraction assembly 14 through the juice outlet 62 and enters the juice bowl 80. The extracted juice can further be strained through the sieve 86 before being entering the juice bowl 80.

Food residue passes through the extraction assembly 14 to the second end thereof and exits through the residue outlet 64 and enters the pulp bowl 78. The adjustable end cap 84 is employed to regulate a pressure within the extraction assembly 14. The adjustable end cap 84 militates against the food residue exiting through the residue outlet 64 until desired and facilitates increasing the amount of juice to be extracted from the food before exiting the extraction assembly 14.

For non-juicing processing operations, the extraction assembly 14 operates similarly as described hereinabove, except the compression chamber 52 is configured for non-juicing processing operations. The compression chamber 52 configured for non-juicing processing operations militates against juice exiting through the juice outlet 62 and facilitates processing, chopping, and mincing. The entirety of the food is guided through the extraction assembly 14 and exits through the residue outlet 64. One of the nozzle accessories 90 can be coupled to the end cap 58 instead of the adjustable end cap 84. The pulp bowl 78 can be used to receive the food exiting the residue outlet 64, if desired. In certain embodiments, the compression chamber 52 is configured for juicing purposes and the auxiliary compression chamber 88 is configured for non-juicing processing operations. Accordingly, the compression chamber 52 used for juicing purposes can be interchanged with the auxiliary compression chamber 88 for non juicing processing operations.

The components (the compression chamber 52, the end cap 58, the auger 54, the drum 50, the extraction components 68) of the extraction assembly 14 can be easily disassembled and interchanged for maintenance or cleaning. To interchange the compression chamber 52, the end cap 58, and auger 54, the end cap lock 59 can be removed to decouple the end cap 58 from the extraction assembly 14. The compression chamber 52, auger 54, and extraction components 68 can then be removed from the extraction assembly 14 and interchanged or cleaned. The drum 50 can also be removed for maintenance or cleaning or interchanged with other drums, as desired, by rotating the locking member 56 to the unlock position.

Advantageously, the juicer 10 is ergonomically configured and facilitates effortless convertibility from the compact storage configuration 100 to an efficient juicing configuration 200. The storage configuration 100 of the juicer 10 is easily transportable, wieldy, maximizes storage space when stored, and facilitates aesthetic appearances. The shell 12 houses and stores all the components (the extraction assembly 14, the motor assembly 16, the pulp bowl 78, the juice bowl 80, the hopper 82, the adjustable end cap 84, the sieve 86, the auxiliary compression chamber 88, the nozzle accessories 90, the insert 28, the cleaning utensil 30) of the juicer 10 in an organized, sanitary, and efficient manner, while protecting the components from damage due to improper storing. The juicer 10 can be easily cleaned and sanitized. The rotatability of the extraction assembly 14 facilitates the effortless convertibility of the juicer 10 without having to completely assemble or disassemble the extraction assembly 14. The extraction assembly 14 can be easily retracted into the shell 12 for storage and extended for operational use.

While certain representative embodiments and details have been shown for purposes of illustrating the invention, it will be apparent to those skilled in the art that various changes may be made without departing from the scope of the disclosure, which is further described in the following appended claims.

What is claimed is:

1. A convertible juicer, comprising:
    a shell formed from a plurality of removable shell segments; and
    an extraction assembly disposed in the shell, the extraction assembly including a drum, a compression chamber disposed in the drum, and an auger disposed in the drum and received by the compression chamber, the extraction assembly and the shell rotatable between a storage configuration and a juicing configuration, wherein the extraction assembly is contained within the shell in the storage configuration and the extraction assembly is exposed from the shell in the juicing configuration.

2. The convertible juicer of claim 1, wherein the shell in the storage configuration has a substantially hyperrectangle shape.

3. The convertible juicer of claim 1, wherein the shell in the storage configuration has a substantially cubical shape.

4. The convertible juicer of claim 1, wherein the shell includes a first aperture for receiving an insert and a second aperture for receiving a cleaning utensil.

5. The convertible juicer of claim 1, wherein the plurality of shell segments include a base segment, a first lower front segment, a second lower front segment, an upper rear segment, and an upper front segment, wherein the first lower front segment, the second lower front segment, and the upper front segment are removable from the shell.

6. The convertible juicer of claim 1, further comprising a motor assembly housed in the shell and removeably coupled to the extraction assembly, the motor assembly configured to actuate the auger.

7. The convertible juicer of claim 1, wherein the extraction assembly includes a residue outlet and a juice outlet.

8. The convertible juicer of claim 7, further comprising a residue bowl configured for receiving food residue exiting the residue outlet of the extraction assembly and a juice bowl configured for receiving extracted juice exiting the juice outlet of the extraction assembly.

9. The convertible juicer of claim 8, wherein each of the juice bowl and the residue bowl is integrally formed with one of the shell segments.

10. The convertible juicer of claim 1, wherein the shell includes a storage compartment formed therein, the storage compartment containing at least one of an auxiliary compression chamber and a plurality of nozzle accessories.

11. The convertible juicer of claim 1, wherein the extraction assembly is rotatably positioned in the shell and includes a feed channel, the feed channel extending downwardly in a first position of the extraction assembly and the feed channel extending upwardly with respect of the shell in a second position of the extraction assembly.

12. The convertible juicer of claim 11, further comprising a hopper for delivering food to the feed channel and an adjustable end cap for facilitating extracting juice from the food, the hopper and the adjustable end cap housed in the shell in the storage configuration.

13. The convertible juicer of claim 1, wherein at least one of the segments of the shell is removed to expose at least a portion of the extraction assembly.

14. A juicer convertible between a storage configuration and a juicing configuration, comprising:
    a shell; and
    an extraction assembly rotatably and retractably positioned in the shell and selectively positionable in at least a first position for a storage configuration and a second position for a juicing configuration, the extraction assembly including a drum, a compression chamber disposed in the drum, and an auger disposed in the drum and received by the compression chamber, the drum includes a feed channel extending outwardly therefrom, wherein the feed channel extends downwardly with respect to the shell in the first position for the storage configuration and the feed channel extends upwardly with respect to the shell for the juicing configuration.

15. The juicer of claim 14, wherein the shell is formed from a plurality of removable shell segments.

16. The juicer of claim 14, further comprising a motor assembly, wherein the extraction assembly is rotatably coupled to the motor assembly.

17. The juicer of claim 14, further comprising a locking member releasably engaging with the extraction assembly and configured to maintain the extraction assembly in at least one of the first position and the second position.

18. The juicer of claim 14, wherein the first position of the extraction assembly is about 180 degrees from the second position.

19. A juicer convertible between a storage configuration and a juicing configuration, comprising:
    at least three shell segments removeably coupled to each other to form a shell, the shell having a bottom wall and a top wall opposing the bottom wall with respect to a lengthwise direction of the shell;
    a motor assembly configured to be disposed in the shell; and
    an extraction assembly retractably positioned in the shell and coupled to the motor assembly, the extraction assembly including a drum, a compression chamber disposed in the drum, and an auger disposed in the drum and received by the compression chamber, the extraction assembly selectively positionable in at least a first position for the storage configuration and a second position for the juicing configuration, wherein the extraction assembly is configured to extract juice from a food and for non-juicing processing operations, wherein the extraction assembly is horizontally positioned in the shell along a widthwise direction of the shell.

20. The convertible juicer of claim 1, wherein the extraction assembly is rotatable about an axis substantially perpendicular to a longitudinal axis of the shell.

* * * * *